Sept. 11, 1962     H. FRAENKEL     3,053,497
EJECTOR DEVICE
Filed May 12, 1960
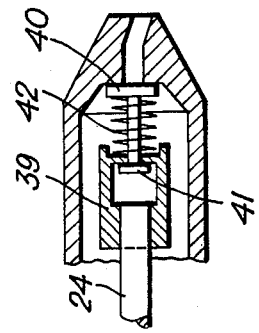
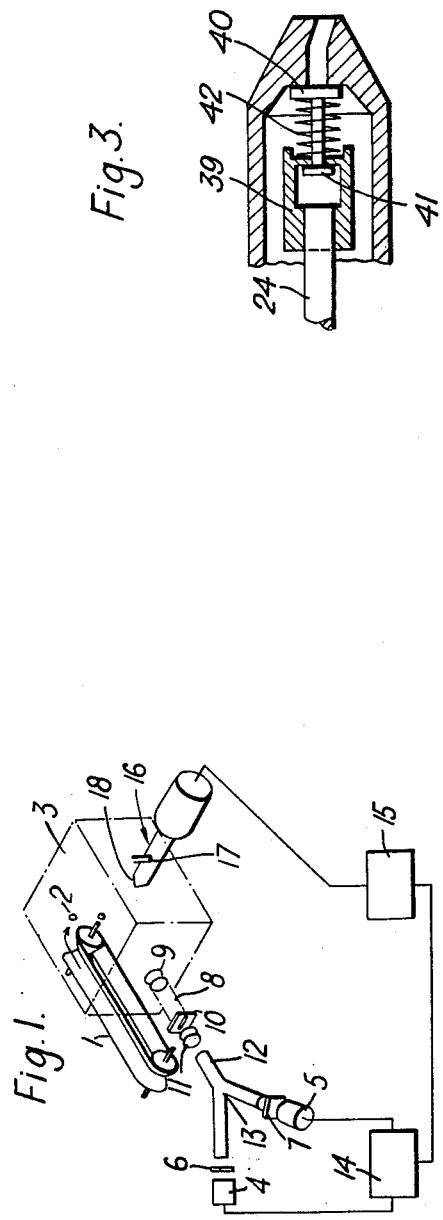
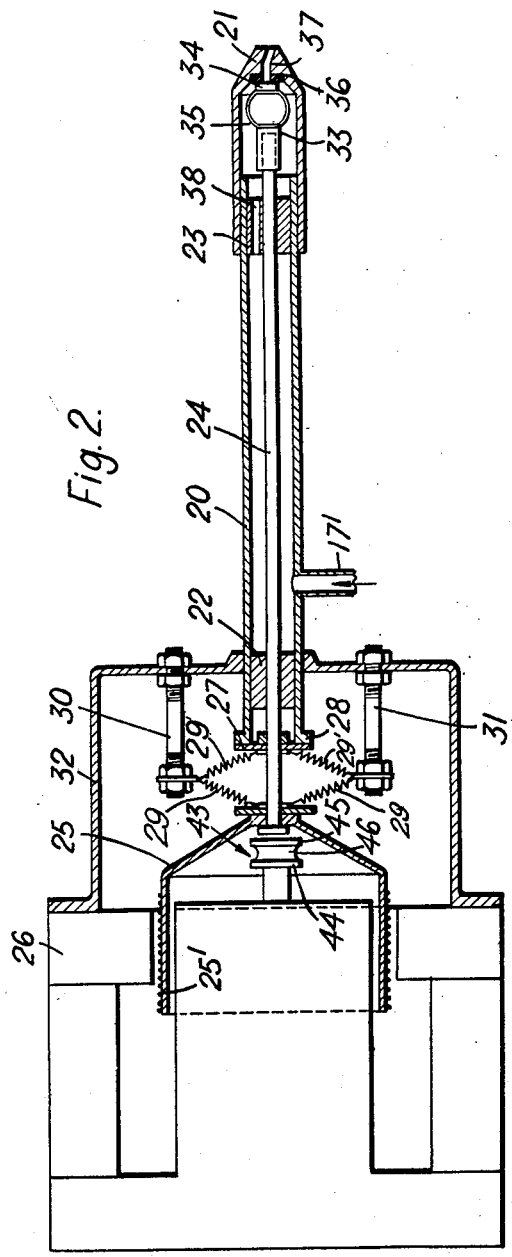
Inventor
Herbert Fraenkel
By Stevens, Davis, Miller & Mosher
Attorneys

United States Patent Office 3,053,497
Patented Sept. 11, 1962

3,053,497
EJECTOR DEVICE
Herbert Fraenkel, London, England, assignor to R. W. Gunson (Seeds) Limited, London, England, a British company
Filed May 12, 1960, Ser. No. 28,630
7 Claims. (Cl. 251—77)

This invention concerns an ejector device for use in a sorting machine for sorting desired from undesired objects (such, for example, as peas or beans).

Such a sorting machine may be provided with viewing means which are arranged to view and to be responsive to the light reflected from a stream of objects to be sorted, and such an ejector device may comprise a nozzle through which a jet of compressed air may be directed onto undesired objects in said stream, the flow of the jet through the nozzle being controlled by a valve which is itself controlled by the viewing means.

The nozzle must, of course, be kept out of the path of the viewing means and must therefore be made small. The valve must therefore be corresponding small since it must be closely adjacent to the nozzle, e.g. there should be no length of tubing between the two. Such tubing should not be provided since time would be taken by the compressed air to flow through the tubing and there would be, in operation, a gradual rise and a gradual fall of pressure in the tubing as a result of which the sorting would be inaccurate. It will be appreciated, therefore, that it is necessary for the valve to have a small obturating member which must be opened and closed very rapidly and this may result in very sharp impact occurring between the valve obturating member and the valve seat of the valve, whereby the life of one or both of these parts is short. It is the object of the present invention to overcome this disadvantage.

According to one aspect of the present invention there is provided an ejector device for removing undesired articles from a stream of articles comprising a valve body having a port therein, a pressure fluid inlet duct communicating with the interior of the valve body, a valve seat mounted in said valve body and surrounding said port, a valve rod, a valve obturating member adapted to seat on said valve seat so as to prevent fluid flow through said port, first resilient means interconnecting the valve rod and the valve obturating member, means for moving the valve rod in a valve opening direction, second resilient means for moving the valve rod in a valve closing direction, and a fixed abutment member which is fast with the valve body and which, when the valve rod is moved by the second resilient means towards the closed position, is engaged by the valve rod abutment with an impact greater than that between the valve obturating member and the valve seat.

Preferably the said second resilient means has a natural frequency lower than that of the said first resilient means.

The said valve seat may be a resilient valve seat.

According to another aspect of the present invention there is provided an ejector device for removing undesired articles from a stream of articles comprising a valve body having a port therein, a pressure fluid inlet duct communicating with the interior of the valve body, a resilient valve seat mounted in said valve body and surrounding said port, a valve rod, a valve obturating member carried by said valve rod and adapted to seat on said valve seat so as to prevent fluid flow through said port, means for moving the valve rod in a valve opening direction, resilient means for moving the valve rod in a valve closing direction, and a fixed abutment member which is fast with the valve body and which, when the valve rod is moved by the resilient means towards the closed position, is engaged by the valve·rod abutment with an impact greater than that between the valve obturating member and the valve seat.

The invention is illustrated, merely by way of example, in the accompanying drawings, in which:

FIGURE 1 is a schematic diagram illustrating the general operation of a sorting machine incorporating an ejector device according to the present invention, FIGURE 2 is a section through an ejector device constituting part of the machine shown in FIGURE 1, and FIGURE 3 is a broken away section illustrating a modified ejector device.

Referring first to FIGURE 1 which shows a diagrammatic representation of the machine of the present invention, a colour sorting machine comprises an endless belt 1 having a V-shaped recess for the reception of objects 2 (such, for example, as peas or beans) which are to be sorted. It will of course be appreciated that feeding devices other than the endless belt shown in FIGURE 1 may be used if desired.

Objects 2, delivered by the belt 1, are allowed to fall freely therefrom and through a cube-shaped frame 3 having internally reflecting walls. As the objects fall through the frame 3 light from lamps within the frame 3 falls on the objects and the light reflected therefrom is viewed by one or more pairs of photocells or photomultipliers 4, 5.

Although only one such pair of photocells or photomultipliers 4, 5 is shown, it is preferred to use four such pairs, one at each side of the frame 3.

The photocells or photomultipliers are respectively provided with differently coloured filters 6, 7 so that one of the photocells or photomultipliers of each pair is sensitive to light of one particular colour reflected by the objects 2 while the other photocell or photomultiplier of the pair is sensitive to light of a differing colour reflected by the objects 2.

The light received by the photocells or photomultipliers 4, 5 from the objects 2 is transmitted by way of a lens tube 8, which contains an objective 9 for focusing an image of an object 2 onto a scanning slot 10, a lens system generally indicated at 11, and a transparent light conducting member 12 having a V-shaped portion, the lens system 11 serving to focus an image of the objective 9 onto the point of separation 13 of the limbs of the V.

The outputs of the photocells or photomultipliers 4, 5 are connected across a difference amplifier 14 the output of which in turn controls an electronic comparator 15 which is adapted to distinguish desired from undesired objects.

When a faulty object 2 falling through the frame 3 is detected by the comparator 15, a signal is transmitted therefrom to an electronically-controlled ejector device 16. Compressed air is delivered to the device 16 via a line 17, and, as a result of the said signal, a valve is opened so that the air is allowed to escape as a jet from a nozzle 18 forming part of the device 16. As a result, the faulty object 2 is ejected.

The ejector device 16 of FIGURE 1 is shown in detail in FIGURE 2.

Referring to FIGURE 2, an ejector device comprises a valve body 20 at whose righthand end (as seen in FIGURE 2) there is provided a nozzle 21 corresponding to the nozzle 18 of FIGURE 1. The valve body 20 is of tubular form and its interior communicates with a line 17' through which compressed air may be introduced from a source thereof, not shown.

The valve body 20 is provided internally at spaced apart points with a pair of sleeves 22, 23 may, for example, be formed of polytetrafluoroethylene. Slidably mounted in the sleeves 22, 23 is a valve rod 24 which is connected at its lefthand end, as seen in FIGURE 2, to an aluminium former 25. The former 25 has wound on it a coil 25' which is disposed between the pole pieces of a permanent magnet 26.

Mounted on the valve rod 24 is a disc 27 which, when the valve is in the closed position shown in FIGURE 2, abuts against a flange 28 provided at the lefthand end of the valve body 20.

The valve rod 24 is urged towards the position in which the valve is closed by means of main springs 29, 29', the springs 29 being in tension, the springs 29' being in compression. The main springs extend between the valve rod 24 and bolts 30, 31, the said bolts being secured to a housing 32 which is itself secured to the permanent magnet 26.

Movement of the valve rod 24 in the valve opening direction is limited by engagement between the lefthand end of the valve rod 24 and a buffer member 43 carried by the magnet 26, the buffer member 43 comprising a pair of steel plates 44, 45 which are bonded to and on opposite sides of a waisted rubber block 46.

At its righthand end the valve rod 24 has mounted on it a sleeve 33 which is connected to a valve obturating member 34 by means of a relatively light sheet metal spring or springs 35. The valve obturating member 34 is adapted to seat on a valve seat member 36 provided within the nozzle 21, whereby the member 34 controls the flow of compressed air through a port 37 in the nozzle. The port 37 has a "flattened" cross section to ensure "fanning" of the air stream directed therefrom so as the better to eject an undesired article.

The sleeve 23 has a longitudinally extending hole 38 therethrough so as to permit passage of the compressed air from the line 17' to the port 37.

As will be seen from FIGURE 2, the springs 29, 29' are, in comparison with the springs 35, of heavy construction and have a lower natural frequency than that of the springs 35.

On energisation of the coil provided on the former 25, the valve rod 24 is moved towards the left so as to withdraw the valve obturating member 34 from its seat and therefore permit compressed air to flow through the port 37. On de-energisation, however, of the said coil, the valve rod is moved into the closed position by means of the springs 29, 29'. In moving into this position, the disc 27 will be brought into engagement with the flange 28 on the valve body 20 immediately after engagement between the valve obturating member 34 and the valve seat 36. The arrangement is such that the main impact arising from closure of the valve will be taken between the parts 27, 28 so that the impact between the valve obturating member 34 and its valve seat member 36 is relatively light. The parts 27, 28 prevent the main springs 29, 29' from biasing the valve obturating member 34 directly onto its valve seat member 36.

The construction shown in FIGURE 2 is therefore such that wear of the valve obturating member 34 as a result of its impact on the valve seat member 36 will be relatively slow.

If the valve seat member 36 is made of rubber or other resilient material, the springs 35 may, if desired, be dispensed with, the valve obturating member 34 being carried directly by the valve rod 24.

In FIGURE 3, there is shown a part of a construction which represents a small modification of the arrangement shown in FIGURE 2. In the FIGURE 3 arrangement, the valve rod 24 is provided at its righthand end with a connection member 39 in which is slidably mounted a valve obturating member 40. The latter is flanged at 41 so as to ensure that it is retained within the member 39, and a coil spring 42 is provided to urge the valve obturating member 40 towards the closed position of the valve. In operation, oscillation of the spring 42 is damped as a result of the impacts between the flanged end 41 of the valve obturating member and the adjacent surface of the member 39.

I claim:
1. An ejector device for directing puffs of air onto a stream of articles to remove undesired articles from said stream, comprising a valve body having a port therein, a pressure fluid inlet duct communicating with the interior of the valve body, a valve seat mounted in said valve body and surrounding said port, a valve rod, a valve rod abutment provided on said valve rod, a valve obturating member adapted to seat on said valve seat so as to prevent fluid flow through said port, first resilient means interconnecting the valve rod and the valve obturating member, means for moving the valve rod in a valve opening direction, second resilient means for moving the valve rod in a valve closing direction, and a fixed abutment member which is fast with the valve body and which, when the valve rod is moved by the second resilient means towards the closed position, is engaged by the valve rod abutment with an impact greater than that between the valve obturating member and the valve seat.

2. An ejector device for directing puffs of air onto a stream of articles to remove undesired articles from said stream, comprising a valve body having a port therein, a pressure fluid inlet duct communicating with the interior of the valve body, a valve seat mounted in said valve body and surrounding said port, a valve rod, a valve rod abutment provided on said valve rod, a valve obturating member adapted to seat on said valve seat so as to prevent fluid flow through said port, first resilient means interconnecting the valve rod and the valve obturating member, means for moving the valve rod in a valve opening direction, second resilient means for moving the valve rod in a valve closing direction, said second resilient means having a natural frequency lower than that of the said first resilient means, and a fixed abutment member which is fast with the valve body and which, when the valve rod is moved by the second resilient means towards the closed position, is engaged by the valve rod abutment with an impact greater than that between the valve obturating member and the valve seat.

3. An ejector device for directing puffs of air onto a stream of articles to remove undesired articles from said stream, comprising a valve body having a port therein, a pressure fluid inlet duct communicating with the interior of the valve body, a valve seat mounted in said valve body and surrounding said port, a valve rod, a valve rod abutment provided on said valve rod, a valve obturating member adapted to seat on said valve seat so as to prevent fluid flow through said port, first resilient means interconnecting the valve rod and the valve obturating member, electromagnetic means for moving the valve rod in a valve opening direction, second resilient means for moving the valve rod in a valve closing direction, and a fixed abutment member which is fast with the valve body and which, when the valve rod is moved by the second resilient means towards the closed position, is engaged by the valve rod abutment with an impact greater than that between the valve obturating member and the valve seat.

4. An ejector device for directing puffs of air onto a stream of articles to remove undesired articles from said stream, comprising a valve body having a port therein, a pressure fluid inlet duct communicating with the interior of the valve body, a resilient valve seat mounted in said valve body and surrounding said port, a valve rod, a valve rod abutment provided on said valve rod, a valve obturating member adapted to seat on said valve seat so as to prevent fluid flow through said port, first resilient means interconnecting the valve rod and the valve obturating member, means for moving the valve rod in a valve opening direction, second resilient means for moving the valve rod in a valve closing direction, and a fixed abutment member which is fast with the valve body and which, when the valve rod is moved by the second resilient means towards the closed position, is engaged by the valve rod abutment with an impact greater than that between the valve obturating member and the valve seat.

5. An ejector device for directing puffs of air onto a stream of articles to remove undesired articles from said stream, comprising a valve body having a port therein, a pressure fluid inlet duct communicating with the interior of the valve body, a valve seat mounted in said valve body and surrounding said port, a valve rod, a valve rod abutment provided on said valve rod, a connection member connected to the valve rod, a valve obturating member slidably mounted within the connection member and adapted to seat on said valve seat so as to prevent fluid flow through said port, first resilient means urging the valve obturating member outwardly of the connection member and towards the valve seat, cooperating abutment means for limiting travel of the valve obturating member outwardly of the connection member, means for moving the valve rod in a valve opening direction, second resilient means for moving the valve rod in a valve closing direction, and a fixed abutment member which is fast with the valve body and which, when the valve rod is moved by the second resilient means towards the closed position, is engaged by the valve rod abutment with an impact greater than that between the valve obturating member and the valve seat.

6. An ejector device for directing puffs of air onto a stream of articles to remove undesired articles from said stream, comprising a valve body having a port therein, a pressure fluid inlet duct communicating with the interior of the valve body, a resilient valve seat mounted in said valve body and surrounding said port, a valve rod, a valve rod abutment provided on said valve rod, a valve obturating member carried by said valve rod and adapted to seat on said valve seat so as to prevent fluid flow through said port, means for moving the valve rod in a valve opening direction, resilient means for moving the valve rod in a valve closing direction, and a fixed abutment member which is fast with the valve body and which, when the valve rod is moved by the resilient means towards the closed position is engaged by the valve rod abutment with an impact greater than that between the valve obturating member and the valve seat.

7. In a sorting machine for sorting desired from undesired articles in a stream of articles, the provision of an ejector device for directing puffs of air onto said stream, comprising a valve body having a port therein, a pressure fluid inlet duct communicating with the interior of the valve body, a valve seat mounted in said valve body and surrounding said port, a valve rod, a valve rod abutment provided on said valve rod, a valve obturating member adapted to seat on said valve seat so as to prevent fluid flow through said port, first resilient means interconnecting the valve rod and the valve obturating member, means for moving the valve rod in a valve opening direction, second resilient means for moving the valve rod in a valve closing direction, and a fixed abutment member which is fast with the valve body and which, when the valve rod is moved by the second resilient means towards the closed position, is engaged by the valve rod abutment with an impact greater than that between the valve obturating member and the valve seat.

References Cited in the file of this patent

UNITED STATES PATENTS

| | | |
|---|---|---|
| 675,704 | Anderson | June 4, 1901 |
| 1,568,057 | Carr | Jan. 5, 1926 |